United States Patent [19]
Natoli et al.

[11] Patent Number: 5,709,714
[45] Date of Patent: Jan. 20, 1998

[54] METHOD OF TREATING LEATHER WITH AMPHOTERIC POLYMERS

[75] Inventors: John Natoli, Ambler; Anthony Frank Volpe, Jr., Lansdale, both of Pa.

[73] Assignee: Rohm and Haas Company, Philadelphia, Pa.

[21] Appl. No.: 799,175

[22] Filed: Feb. 12, 1997

Related U.S. Application Data

[60] Provisional application No. 60/013,620 Mar. 11, 1996.
[51] Int. Cl.$^6$ ............................................. C14C 3/22
[52] U.S. Cl. .................. 8/94.21; 8/94.22; 8/94.23; 8/94.33; 8/436
[58] Field of Search ............................ 8/94.21, 94.22, 8/94.23, 94.33, 404, 436

[56] References Cited

U.S. PATENT DOCUMENTS

| | | |
|---|---|---|
| 3,404,114 | 10/1968 | Snyder et al. . |
| 3,744,969 | 7/1973 | Alps et al. . |
| 3,901,929 | 8/1975 | Cote ........................ 8/94.26 |
| 4,314,800 | 2/1982 | Monsheimer et al. ............ 8/94.33 |
| 4,596,581 | 6/1986 | Hohr et al. ................. 8/94.21 |
| 4,760,110 | 7/1988 | Das . |
| 4,791,161 | 12/1988 | Leising . |
| 4,813,968 | 3/1989 | Kaussen et al. . |
| 4,857,585 | 8/1989 | Leising . |
| 4,946,471 | 8/1990 | Friess et al. . |
| 4,980,437 | 12/1990 | Kaussen et al. ................ 526/307 |
| 5,171,637 | 12/1992 | Stiberth et al. . |
| 5,185,387 | 2/1993 | Klesse et al. . |
| 5,330,537 | 7/1994 | Stewart et al. . |

OTHER PUBLICATIONS

Kirk–Othmer Encyclopedia of Chemical Technology, 3rd Ed., vol. 11, 1980, pp. 711–713. (Month Unknown).

*Primary Examiner*—Alan Diamond
*Attorney, Agent, or Firm*—Sudhir G. Deshmukh

[57] ABSTRACT

The present invention is directed to a method of treating tanned leather stock to improve its color expression characteristics. The method provides for utilizing a two-stage amphoteric polymers, which improve the color expression characteristic of the tanned leather stock while still retaining desired grain break and tensile strength. The tanned leather stock is contacted, preferably by immersion, in a float containing particles of an amphoteric polymer dispersed therein and a desired colorant. The amphoteric polymer particles comprise a first stage copolymer polymerized from at least one monomer containing an anionic functionality, such as, an acid functionality, with at least one first stage comonomer and a second stage copolymer polymerized from at least one monomer containing the cationic functionality, such as, an amine functionality, with at least one second stage comonomer.

8 Claims, No Drawings

METHOD OF TREATING LEATHER WITH AMPHOTERIC POLYMERS

This application claims the benefit of provisional application Ser. No. 60/013,620 filed Mar. 11, 1996.

The present invention is directed to treating leather and more particularly to a method for retanning leather to improve its color expression characteristic, which refers to the degree of uniformity of hue, intensity and saturation of color of leather as well as the degree of penetration of color in the leather skin provided by the colorant used during the coloring of leather.

The treatment of hides and skins to form leather involves a number of interdependent chemical and mechanical operations. These operations may be divided into a sequence of wet end steps, i.e., process steps under wet conditions, followed by a sequence of dry steps, i.e., process steps under dry conditions. A typical leather making process involves the following sequence of wet-end steps: trimming and sorting, soaking, fleshing, unhairing, baiting, pickling, tanning, wringing, splitting and shaving, retanning, coloring, fatliquoring and setting out. These wet-end steps are followed by a sequence of dry steps, such as, drying, conditioning, staking, buffing, finishing, plating, measuring and grading. A description of each of these operations is provided in Leather Facts, New England Tanners (1972).

The present invention is involved with the wet-end steps that take place after primary tanning; namely retanning and if desired, fatliquoring. The object of primary tanning is to convert the hide, pelt or skin to a stable non-spoilable material. This is accomplished by converting raw collagen fibers in the hide or skin into a stable product which is non-putrescible, or in other words will not rot. In addition, tanning improves a number of properties of the hide, pelt or skin, such as, for example, dimensional stability, abrasion resistance, resistance to chemicals and heat, improved flexibility and the ability to endure repeated cycles of wetting and drying. The principal method used to tan hides, pelts and skins is known as "chrome tanning". This employs a basic chromium sulfate, often referred to simply as "chrome", which is prepared by the reaction of a chromium salt, such as, sodium bichromate, with a sugar-like substance and sulfuric acid. The chrome penetrates into the skin and imparts a bluish-green color to the skin. The color change is typically used to assess the extent of penetration or degree of tanning. Hides, pelts and skins may also be tanned using vegetable extracts, for example, extracts from trees and shrubs, such as, quebracho, wattle, sumac, hemlock, oak and spruce.

After primary tanning, the leather is retanned, colored and fatliquored. This three step operation is often considered together as one step since all these three operations may be carried out sequentially in the same retanning drum. Tanned leather stock, also referred to sometimes, as blue stock, retains much of the uneven fiber structure pattern in the skirt on the animal. Some areas of the skin possess a dense structure while other portions are loosely fibered and some portions may be undesirably thin and papery. Since the tanner desires to produce a uniform piece of leather, a step, known as "retanning", is employed to improve both aesthetic and physical properties. These properties include, for example, improvements to the fullness of the leather, the tightness and smoothness of the grain, the break, the levelness and intensity of the dye shade, better uniformity in temper or flexibility, better wettability and additional stability against water and perspiration.

Retanning can be accomplished by using a variety of naturally derived materials including extracts from vegetables or plants, and synthetic tanning agents known as "syntans", or combinations thereof. Historically, extracts from trees and shrubs like quebracho, wattle, sumac, hemlock, oak and spruce were used as retanning agents. Over the past 50 years, many man-made syntans were developed and these are used extensively today. Naphthalene-formaldehyde and phenolic-formaldehyde syntans have been used as replacements for natural tannins and are strong dispersants for several other retanning chemicals. Cyanamide, dicyandiamide, urea, and melamine also react with formaldehyde to yield useful syntans. Acrylic syntans are acrylic based polymers that can be used as replacement or auxiliary syntans and sometimes as polymeric softeners depending on the types of monomeric species in the polymer. In some instances the hide may be retanned with chromium sulfate before the regular retanning step to fully tan any previously untanned portions and to level out the chrome especially in the grain for more uniform dyeing. After retanning or, if desired, during retanning, the hide is colored with colorants, such as, acid dyes, mordant dyes, direct dyes, metalized dyes, soluble sulfur dyes, and cationic dyes. Colorants which penetrate the leather skin or those that only impart color to the leather surface are typically utilized. In general, acidic dyes penetrate through the leather skin while basic dyes are used to color the leather surface. Colorants include natural pigments and synthetic dyes that are used to achieve the required color in both the cross section and the surface of crust leather before the finishing step. Colorants are classified both by chemistry and color. Leather during the wet-end process is typically treated with colorants alone or in combination with retanning agents.

After retanning and coloring, the hide is then subjected to a fatliquoring step. Fatliquoring imparts the desired properties of strength, softness and temper to the leather after leather is dried. It is believed, without reliance thereon, that fatliquor lubricates the leather fibers so that after drying the fibers are capable of sliding over one another. In addition to regulating the pliability of the leather, fatliquoring contributes greatly to the tensile and tearing strength of the leather. Fatliquoring also affects the tightness of the break or, in other words, the crease pattern formed when the grain surface is bent inward; the object being to produce a leather which leaves no or few fine wrinkles when it is bent.

Natural and synthetic materials used during the fatliquoring process are called fatliquors. These natural and synthetic materials are derived from fatty acids, fatty esters; oils from animal, vegetable, fish, petroleum sources; and a variety of synthetic materials, such as, lubricating acrylic syntans disclosed in the U.S. Pat. Nos. 5,330,537 and 5,348,807. Some of these lubricating acrylic syntans produce leather that is water resistant, washable, dry-cleanable and having a low fogging characteristic. Leather during the wet-end process is typically treated with fatliquors alone or in combination with retanning agents. Typically 3 to 10 weight percent of fatliquor, based on weight of wet leather stock, is used during the fatliquoring process. The manner in which the fatliquor is distributed throughout the leather affects the character of the leather and subsequent finishing operations. To obtain a uniform oil coating over a large surface of leather fibers it is necessary to dilute the fatliquor with an organic solvent or preferably to disperse the oil in an aqueous system using emulsifiers. See Leather Technician's Handbook, J. H. Sharphouse, Leather Producers' Association (1971) chapters 21 and 24.

Techniques directed to improving color expression characteristic of the retanned leather have been tried before.

Monsheimer, et al. in U.S. Pat. No. 4,314,800 (hereafter '800 patent) describe the use of an aqueous solution or dispersion of a copolymer comprising monomers of a nitrogenous ester of acrylic or methacrylic acid, acrylic or methacrylic acid, and a different ester of acrylic or methacrylic acid for compensating the negative effects of the outward appearance of naturally dyed, soft aniline leather. The copolymer described in the '800 patent has acid and nitrogenous groups on the same polymer backbone. The applicants have unexpectedly discovered that the color expression characteristic of the retanned leather can be significantly improved by using a polymer wherein the acid and he basic groups are on different polymer segments, i.e., by using multi-stage amphoteric polymers while still retaining desired grain break and tensile strength.

The present invention is directed to a method of treating a tanned leather stock comprising:

retanning said tanned leather stock with particles of an amphoteric polymer dispersed in an aqueous medium to produce a retanned leather stock having improved color expression characteristic, said and amphoteric polymer particles comprising:

a first stage copolymer polymerized from at least one monomer containing an anionic functionality with at least one first stage comonomer, and a second stage copolymer polymerized from at least one monomer containing the cationic functionality with at least one second stage comonomer.

The method of the present invention further comprises retanning, fatliquoring or waterproofing of the tanned leather stock.

As used herein:

"GPC weight average molecular weight" means the weight average molecular weight determined by gel permeation chromatography (GPC) which is described on page 4, Chapter I of The Characterization of Polymers published by Rohm and Haas Company, Philadelphia, Pa. in 1976, utilizing polymethyl methacrylate as the standard. The GPC weight average molecular weight can be estimated by calculating a theory weight average molecular weight. In systems containing chain transfer agents, the theory weight average molecular weight is simply the total weight of polymerizable monomer in grams divided by the total molar amount of chain transfer agent used during the polymerization. Estimating the molecular weight of an emulsion polymer system that does not contain a chain transfer agent is more complex. A cruder estimate can be obtained by taking the total weight of polymerizable monomer in grams and dividing that quantity by the product of the molar amount of an initiator multiplied by an efficiency factor (in our persulfate initiated systems, we have used a factor of approximately 0.5). Further information on theoretical molecular weight calculations can be found in *Principles of Polymerization* 2nd edition, by George Odian published by John Wiley and Sons, N.Y., N.Y. in 1981 and in *Emulsion Polymerization* edited by Irja Pirma published by Academic Press, N.Y., N.Y. in 1982.

"Glass transition temperature (Tg)" is a narrow range of temperature, as measured by conventional differential scanning calorimetry (DSC), during which amorphous polymers change from relatively hard brittle glasses to relatively soft viscous rubbers. To measure the Tg by this method, the copolymer samples were dried, preheated to 120° C., rapidly cooled to −100° C., and then heated to 150° C. at a rate of 20° C./minute while data was being collected. The Tg was measured at the midpoint of the inflection using the half-height method. Alternatively, the reciprocal of the glass transition temperature of a particular copolymer composition may typically be estimated with a high degree of accuracy by calculating the sum of the respective quotients obtained by dividing each of the weight fractions of the respective monomers, $M_1, M_2, \ldots M_n$, from which the copolymer is derived by the Tg value for the homopolymer derived from the respective monomer, according to an equation of the form:

$$1/T_{g(copolymer)} = \sum_{i=1}^{n} w_{(Mi)}/T_{g(Mi)} \quad (1)$$

wherein:

$T_{g(copolymer)}$ is the estimated glass transition temperature of the copolymer, expressed in °Kelvin (°K);

$w_{(Mi)}$ is the weight fraction of repeat units in the copolymer derived from an $i^{th}$ monomer $M_i$; and $T_{g(Mi)}$ is the glass transition temperature, expressed in °Kelvin (°K), of the homopolymer of an $i^{th}$ monomer $M_i$.

The glass transition temperature of various homopolymers may be found, for example, in "Polymer Handbook", edited by J. Brandrup and E. H. Immergut, Interscience Publishers.

"Tanned leather stock" means hides, such as, those from bovines; skins, such as, those from pig, sheep, deer and snake; and pelts from furry animals, such as, rabbits, mink, sable and otter, that have been subjected to chrome or other metal or vegetable tanning step.

"Retanned leather stock" means tanned leather stock that has been subjected to retanning step.

"Crust leather stock" means retanned leather stock that has been dried and staked, i.e., mechanically softened.

"Float" means the weight of water added to the tanning drum before the start of retanning or other operations, such as, coloring and Fatliquoring.

"Amphoteric" means having the capacity of behaving as either an acid or a base.

"Amphoteric syntan" means colloidal dispersion of particles of an amphoteric polymer in an aqueous medium or an aqueous mixture of "solubilized amphoteric polymer" (defined below) with the colloidal dispersion of the particles of the amphoteric polymer in the aqueous medium.

"Solubilized amphoteric polymer" includes "Water Soluble amphoteric polymer", "Water reducible amphoteric polymer" or a mixture thereof. Water soluble amphoteric polymer means an amphoteric polymer dissolved in water. Water reducible amphoteric polymer means an amphoteric polymer dissolved in water and water miscible solvent. Solubilized amphoteric polymer results in a polymer solution characterized by having the self-crowding constant (K) of the Mooney equation $[1/\ln_{hrel}=1/BC-K/2.5]$ equal to zero. By contrast, dispersed polymer has (K) equal to 1.9. The details of Mooney equation are disclosed in an article entitled "*Physical Characterization of Water Dispersed and Soluble Acrylic Polymers*" by Brendley et al., in "Nonpolluting Coatings and Coating Processes" published by Plenum Press, 1973 and edited by Gordon and Prane.

"Polymer particle size" means the diameter of the amphoteric polymer particles measured by using a Brookhaven Model BI-90 Particle Sizer supplied by Brookhaven Instruments Corporation, Holtsville, N.Y., which employs a quasi-elastic light scattering technique to measure the size of the polymer particles. The intensity of the scattering is a function of particle size. The diameter based on an intensity weighted average is used. This technique is described in Chapter 3, pages 48–61, entitled *Uses and Abuses of Photon Correlation Spectroscopy in Particle Sizing* by Weiner et al. in 1987 edition of American Chemical Society Symposium series.

"Amphoteric polymer solids" means amphoteric polymer in its dry state.

The term "(meth)acrylate" includes acrylate and methacrylate.

The first step of the method of the present invention includes contacting a tanned leather stock with particles of an amphoteric polymer dispersed in an aqueous medium to produce retanned leather stock having improved color expression characteristic. Preferably the tanned leather stock is immersed, more preferably in a tumbler drum which contains float maintained in range of 25° C. to 60° C., preferably in the range of 25° C. to 45° C., for 15 minutes to 3 hours, preferably for 30 minutes to an hour. The float contains the aqueous medium containing the dispersion of the amphoteric polymer particles. Tumbling of the tanned leather stock in the tumbler drum containing the particles of the amphoteric polymer dispersed in an aqueous medium is preferred.

The amphoteric polymer in the form of particles of the amphoteric polymer dispersed in the aqueous medium is preferred, wherein the particle size of the dispersed polymer particles varies in the range of from 20 to 1000 nanometers, preferably in the range of from 50 to 500 nanometers, more preferably in the range of from 70 to 150 nanometers. The aqueous evaporable medium includes water or water having dissolved therein a water miscible organic solvent, such as, methanol, ethanol and glycol ethers. Water is preferred.

The aqueous evaporable medium includes in the range of from 15 percent to 75 percent, preferably in the range of from 30 percent to about 50 percent of the particles of the amphoteric polymer, all in weight percentages based on amphoteric syntans.

The amount of amphoteric polymer added to the float varies from 0.25 parts by weight (pbw) to 10 pbw, preferably 0.5 pbw to 5.0 pbw, of the amphoteric polymer per 100 pbw of the wet tanned leather stock.

The amphoteric polymer includes multi-stage polymer particles having two or more stages of various geometric structures, such as, for example, exterior/interior regions, core/sheath particles, core/shell particles with shell phases incompletely encapsulating the core, core/shell particles with a multiplicity of cores and interpenetrating network particles. A first stage of the amphoteric polymer is a copolymer, emulsion polymerized from at least one monomer containing an anionic functionality with at least one first stage comonomer and a second stage copolymer emulsion polymerized from at least one monomer containing the cationic functionality with at least one second stage comonomer.

The particles of the amphoteric polymer include in the range of from 90 percent to 10 percent, preferably in the range of from 65 percent to 35 percent, of the first stage copolymer and in the range of from 10 percent to 90 percent, preferably in the range of from 35 percent to 65 percent, of the second stage copolymer, all percentages being in weight percent based on the total weight of the amphoteric polymer solids.

The copolymer of the first stage has a $T_g$ in the range of from −40° C. to 140° C., preferably, in the range of from −30° C. to 120° C. and, more preferably, in the range of from −20° C. to 100° C. The copolymer of the first stage has a weight average molecular weight, as determined by gel permeation chromatography using a sample of the copolymer, in the range of from 5,000 to 3,000,000, preferably in the range of from 7,500 to 1,000,000 and more preferably in the range of from 10,000 to 100,000.

The monomer of the first stage containing the anionic functionality of the copolymer of the first stage include one or more of the monoethylenically unsaturated carboxylic acid monomers which include, for example, acrylic acid, methacrylic acid, itaconic acid, crotonoic acid, aconitic acid, atropic acid, maleic acid, maleic anhydride, fumaric acid, vinyl benzoic acid, half-esters of ethylenically unsaturated dicarboxylic acids, half-amides of ethylenically unsaturated dicarboxylic acids and various mixtures thereof. Other suitable monomer of the first stage containing the anionic functionality include one or more monomethyl itaconate, monomethyl fumarate, monobutyl fumarate, acrylamido propane sulfonate, sodium vinyl sulfonate and phosphoethyl (meth)acrylate. The monomer of the first stage containing the monoethylenically unsaturated carboxylic acid are preferred and acrylic acid, methacrylic acid and mixtures thereof are more preferred.

The first stage comonomer include one or more copolymerizable monoethylenically unsaturated monomers, that is, a monomer having a single ethylenically unsaturated site per molecule. Such monomers include olefins, ($C_1$–$C_{20}$) alkyl or hydroxy alkyl (meth)acrylate monomers, vinyl aromatic monomers, vinyl esters, neutral monomers, crosslinkable monomers and various mixtures thereof.

Suitable alkyl or hydroxy alkyl (meth)acrylate monomers include ($C_1$–$C_{20}$)alkyl (meth)acrylate monomers. As used herein the terminology "$C_1$–$C_{20}$)alkyl" denotes an alkyl substituent group having from 1 to 20 carbon atoms per group. Suitable ($C_1$–$C_{20}$)alkyl (meth)acrylate monomers include, for example, acrylic and methacrylic ester monomers including methyl (meth)acrylate, ethyl (meth)acrylate, butyl (meth)acrylate, 2-ethylhexyl (meth)acrylate, decyl (meth)acrylate, lauryl (meth)acrylate, cetyl (meth)acrylate, eicosyl (meth)acrylate, isobornyl (meth)acrylate, isodecyl (meth)acrylate, oleyl (meth)acrylate, palmityl (meth)acrylate, stearyl (meth)acrylate, hydroxyethyl (meth)acrylate, and hydroxypropyl (meth)acrylate, or various mixtures thereof.

Suitable vinyl ester monomers include, for example, vinyl acetate, vinyl propionate, vinyl neononanoate, vinyl neodecanoate, vinyl-2-ethylhexanoate, vinyl pivalate, vinyl versatate or a mixture thereof. Suitable vinyl monomers include, for example, vinyl halide, preferably vinyl chloride, vinylidene halide, preferably vinylidene chloride, or various mixtures thereof.

Suitable vinyl aromatic monomers include, for example, one or more polymerizable vinyl aromatic compounds and mixtures thereof and also include styrene, alkyl-substituted styrenes, such as, α-methylstyrene, α-ethylstyrene, p-methylstyrene and vinyl xylene, halogenated styrenes, such as, chlorostyrene, bromostyrene and dichlorostyrene, other styrenes having one or more nonreactive substituents on the benzene nucleus, vinyl naphthalene or various mixtures thereof.

Suitable neutral monomers include, for example, one or more monomers, such as, acrylonitrile, acrylamide, alkyl substituted acrylamide monomers or mixtures thereof.

Suitable crosslinkable monomers include allyl (meth) acrylate; acrylic and methacrylic esters of diols, triols, such as, ethylene di(meth)acrylate, 1,3-butylene di(methacrylate), 1,6-hexane di(meth)acrylate, trimethylolpropane triacrylate; divinyl benzene; dicyclopentadienyl (meth)acrylate; butadiene monomers; glycidyl (meth) acrylate; acetoacetoxyetlyl (meth)acrylate; acrolein, methacrolein; isocyanoatoethyl methacrylate, dimethyl metaisopropenyl benzyl isocyanate or various mixtures thereof.

The first stage comonomer is preferably a monoethylenically unsaturated monomer selected from the group consisting of methyl methacrylate, butyl acrylate, butyl methacrylate, ethyl acrylate, ethylhexyl acrylate, styrene, methyl styrene and various mixtures thereof.

Even more preferred first stage comonomer is at least one or more of the following monomeric mixtures:

1) butyl acrylate and methyl methacrylate,
2) butyl methacrylate and methyl methacrylate,
3) butyl acrylate and styrene,
4) 2-ethylhexyl acrylate with methyl methacrylate, or
5) 2-ethylhexyl acrylate with styrene.

The most preferred monoethylenically unsaturated monomer is a mixture of styrene and 2-ethylhexyl acrylate.

The copolymer of the first stage includes in the range of from 0.5 percent to 20.0 percent, preferably in the range of from 5 percent to 15 percent, of the monomer containing the anionic functionality and in the range of from 99.5 percent to 80.0 percent, preferably in the range of from 95 percent to 85 percent, of the first stage comonomer, all percentages being in weight percent based on the total weight of the amphoteric polymer solids.

The copolymer of the second stage has a $T_g$ in the range of from –40° C. to 140° C., preferably, in the range of from –30° C. to 120° C. and, more preferably, in the range of from –20° C. to 100° C. The copolymer of the second stage has a weight average molecular weight, as determined by aqueous gel permeation chromatography using a hydrolyzed sample of the copolymer, in the range of from 5,000 to 3,000,000, preferably in the range of from 7,500 to 1,000,000 and more preferably in the range of from 10,000 to 100,000.

The monomer of the second stage containing the cationic functionality includes one or more of monomers containing an amine functionality, such as, for example, tert-buytlaminoethyl acrylate, dimethylaminoneopentyl (meth)acrylate, diethylaminopropyl (meth)acrylamide, dimethylamino-2,2'-dimethylpropyl (meth)acrylamide, amino-substituted olefins, such as, p-diethylaminoethyl styrene; basic nitrogen-containing heterocycles that carry a polymerizable ethylenically unsaturated substituent, such as, for example, vinyl pyridine, N-vinyl pyrrolidone and 2-vinyl-5-ethyl pyridine; esters of amino alcohols with ethylenically unsaturated carboxylic acids, such as, for example, N, N-dimethylaminoethyl acrylate, N, N-diethylaminoethyl acrylate, N, N-dimethylaminoethyl methacrylate, N, N-diethylaminoethyl methacrylate and N-tert-butylaminoethyl acrylate; monoamides of diamines of ethylenically unsaturated carboxylic acids, such as, for example, N, N-dimethylaminopropyl acrylamide and N, N-dimethylaminopropyl methacrylamide and the quaternary ammonium salts of the above, such as those derived from methyl chloride, or dimethyl sulfate.

The second stage comonomer is selected from one or more monomers from the list of monomers described earlier with respect to the first stage comonomer. If desired, it is contemplated that one of ordinary skill in the art may utilze the same first stage comonomer as the second stage comonomer during polymerization of the second stage copolymer.

The copolymer of the second stage includes in the range of from 0.5 percent to 20.0 percent, preferably in the range of from 5 percent to 15 percent, of the monomer containing the cationic functionality and in the range of from 99.5 percent to 80.0 percent, preferably in the range of from 95 percent to 85 percent, of the second stage comonomer, all percentages being in weight percent based on the total weight of the amphoteric polymer solids.

The polymerization techniques used for preparing the amphoteric polymer of the present invention are well known in the art. The amphoteric polymer may be prepared by emulsion polymerization. Either thermal or redox initiation processes may be used.

The multi-stage polymer particles of the amphoteric polymer are prepared by conventional emulsion polymerization process in which at least two stages differing in composition are formed in a sequential fashion. Such a process usually results in the formation of at least two polymer compositions. Each of the stages of the multi-stage polymer particles may contain the same chain transfer agents, surfactants, as those disclosed below. The emulsion polymerization techniques used for preparing such multi-stage polymer particles are well known in the art and are disclosed, for example, in the U.S. Pat. Nos. 4,325,856, 4,654,397, 4,814,373 and 4,916,171.

The polymerization process is typically initiated by conventional free radical initiators, such as, for example, hydrogen peroxide, t-butyl hydroperoxide, ammonium and alkali persulfates, typically at a level of 0.05 percent to 3.0 percent by weight, all weight percentages based on the weight of total monomer. Redox systems using the same initiators coupled with a suitable reductant such as, for example, sodium bisulfite, sodium hydrosulfite and ascorbic acid, may be used at similar levels.

Chain transfer agents may be used in an amount effective to provide the desired GPC weight average molecular weight. For the purposes of regulating molecular weight of the amphoteric polymer being formed, suitable chain transfer agents include well known halo-organic compounds, such as, carbon tetrabromide and dibromodichloromethane; sulfur-containing compounds, such as, alkylthiols including ethanethiol, butanethiol, tert-butyl and ethyl mercaptoacetate, as well as aromatic thiols; or various other organic compounds having hydrogen atoms which are readily abstracted by free radicals during polymerization. Additional suitable chain transfer agents or ingredients include but are not limited to butyl mercaptopropionate; isooctylmercapto propionate; bromoform; bromotrichloromethane; carbon tetrachloride; alkyl mercaptans, such as, 1-dodecanthiol, tertiary-dodecyl mercaptan, octyl mercaptan, tetradecyl mercaptan, and hexadecyl mercaptan; alkyl thioglycolates, such as, butyl thioglycolate, isooctyl thioglycoate, and dodecyl thioglycolate; thioesters; or combinations thereof. Mercaptans are preferred.

When a dispersion of amphoteric polymer particles is utilized, the polymer particle size is controlled by the amount of conventional surfactants added during the emulsion polymerization process. Conventional surfactants include anionic, nonionic emulsifiers or their combination. Typical anionic emulsifiers include the salts of fatty rosin and naphthenic acids, condensation products of naphthalene sulfonic acid and formaldehyde of low molecular weight, carboxylic polymers and copolymers of the appropriate hydrophile-lipophile balance, alkali or ammonium alkyl sulfates, alkyl sulfonic acids, alkyl phosphonic acids, fatty acids, and oxyethylated alkyl phenol sulfates and phosphates. Typical nonionic emulsifiers include alkylphenol ethoxylates, polyvinyl alcohols, polyoxyethylenated alkyl alcohols, amine polyglycol condensates, modified polyethoxy adducts, long chain carboxylic acid esters, modified terminated alkylaryl ether, and alkylpolyether alcohols. Typical ranges for surfactants are between 0.1 to 6 percent by weight based on total weight of total monomer.

Preferably, the first stage copolymer of the amphoteric polymer is emulsion polymerized in the aqueous medium by copolymerizing at least one monomer containing the anionic functionality, such as, the acid functionality, with at least one first stage comonomer. Once the copolymerization is completed, the pH of said aqueous medium is sufficiently raised to avoid coagulation of the amphoteric polymer particles in the presence of an cationic functionality by adding a base, such as, ammonia, alkali metal hydroxide, morpholine and lower alkyl amine, to the aqueous medium. The pH of the aqueous medium is typically raised to be in the range of from 6 to 12, preferably in the range of from 8 to 11.

Following the addition of base, the second stage copolymer of the amphoteric polymer is emulsion polymerized in the aqueous medium by copolymerizing at least one monomer containing the cationic functionality, such as, the amine functionality, with at least one second stage comonomer.

The aqueous medium containing the amphoteric syntan is added to the float, which may contains one or more colorants, for imparting the desired color to the tanned leather stock. If desired, one or more colorants may be added to the float after the addition of the aqueous medium containing the amphoteric syntan to the float. Typically one or more colorants in the range of from 0.5 percent to 7.5 percent per 100 percent of the weight of wet tanned stock are added to the float during the retanning step or, if desired, added as a coloring separate step after the retanning step. The amount of colorant added depends upon the desired result, i.e., if coloring of the leather surface is desired, preferably colorants in the range of from 0.5 percent to 4.0 percent per 100 percent of the weight of wet tanned stock are added to the float. Higher amounts may be needed if penetration of colorant in the leather skin is desired. Some of the typical dyes used in coloring leather include anionic dyes, such as, those supplied by Sandoz Chemical Corporation, Charlotte, N.C., include Derma Blue R 67, Derma Green BS, Derma Grey LL. Some of the anionic metal complex dyes supplied by Sandoz Chemical Corporation, Charlotte, N.C., include Sandoderm Yellow R, Sandoderm Brown G.

If desired, the float further contains one or more fatliquors, such as, those described earlier, for improving the strength and temper of the retanned leather stock. If desired, the fatliquoring step may be combined with the retanning step or coloring step.

Preparation of Syntans

EXAMPLE 1

Comparative Example 1 was a solubilized polymer commercially available as Relugan®, RE—Anionic acrylic syntan and supplied by BASF Corporation, Rensselaer, N.Y. 12144.

EXAMPLE 2

Comparative Example 2 was a solubilized amphoteric polymer commercially available as Magnopal®, III— Amphoteric acrylic syntan and supplied by Stockhausen, Greensboro, N.C. 27406

EXAMPLE 3

Comparative Example 3 was a solubilized copolymer was prepared in the following manner:

At the start of preparation, 1250 g of deionized water (DI water) was added to a 3 liter, round bottom, four necked flask, equipped with an agitator, a condenser, a thermocouple to monitor the temperature, inlet ports for nitrogen gas, a monomer feed line and an initiator feed line. The headspace of the flask was swept with nitrogen and then the contents were heated to 85° C. In a separate vessel, a monomer mix was prepared front 300 g of acrylic acid (AA) and 200 g of methacrylic acid (MAA) to provide a 60/40 proportion by weight. A portion of the monomer mix (50 g) was added to the flask, followed by 2 g of ammonium persulfate dissolved in 10 g of deionized water. After 20 minutes, feeds of the remaining monomer mix and a solution of 5 g of ammonium persulfate dissolved in 60 g of deionized water were begun and continued at a constant rate for a period of two hours while the reaction temperature was maintained at 90° C. When the feeds were completed, the feed lines were rinsed with 35 g of deionized water and the reaction mixture was maintained at 90° C. for another hour. The reaction mixture was then cooled and poured into a jar. The resulting clear, pale yellow solution polymer was found to have a 27.7 weight percent solids content, a pH of 2.2 and a viscosity of 815 cps (measured by Brookfield viscometer with No. 2 spindle rotated at 30 rpm).

EXAMPLE 4

Comparative Example 4 was a one-stage amine and acid containing amphoteric copolymer dispersion prepared according to Example 1 from U.S. Pat. No. 4,314,800. The copolymer was polymerized from a monomeric mixture containing 77.9 percent butyl acrylate (BA)/9.4 percent methtyl methacrylate (MMA)/10 dimethyl aminoethyl methacrylate (DMAEMA)/2.7 MAA, all by weight percentages based on polymer solids.

EXAMPLE 5

Comparative Example 5 was a two-stage amine after acid, amphoteric copolymer prepared according to Example 1 from U.S. Pat. No. 3,404,114. The copolymer was polymerized from a first stage monomeric mixture containing 32.5 percent ethyl acrylate (EA), 15.3 MAA, 0.5 percent AA and 1.0 percent MAA and a second stage monomeric mixture containing 32.5 percent EA, 15.3 percent MMA and 2.9 percent (tertiary-butyl aminoethyl methacrylate) t-BAEMA, all by weight percentages based on polymer solids.

EXAMPLE 6

At the start of the preparation, 255 g of deionized water and 3.6 g of Alipal® CO-436 anionic surfactant, ammonium salt of sulfated polyethoxynonylphenol @ 58 percent concentration were added to a 3 liter, round bottom, 4 neck glass flask, equipped with an agitator, a condenser, a thermocouple to monitor the temperature and inlet ports for nitrogen gas, and for adding reagents. The headspace was swept with nitrogen and the contents of the flask were heated to 85° C. In a separate vessel, a first monomer pre-emulsion was prepared from 255 g deionized water, 3.9 g of Alipal® CO-436 anionic surfactant, 150 g styrene, 175 g of 2-ethylhexyl acrylate (2-EHA), 35 g methacrylic acid and 1.1 g butyl mercaptopropionic acid. A heel charge of 20 g of the monomer pre-emulsion, 0.75 g of ammonium persulfate dissolved in 7.5 g of deionized water and 1.4 g of sodium carbonate dissolved in 15 g of deionized water was added to the reaction flask. After 10 minutes, the remainder of the first monomer pre-emulsion and 0.35 g of ammonium persulfate dissolved in 45 g of deionized water were added continuously to the flask over 1.5 hours while maintaining the reaction temperature at 85° C. A total of 45 g of deionized water was used to rinse the feed lines to the flask. The reaction mixture was maintained for another 30 minutes at 85° C. and then cooled to 60° C. while a second monomer pre-emulsion was prepared from 214 g of deionized water, 3.8 g of Alipal® CO-436 anionic surfactant, 140 g styrene (Sty), 175 g 2-ethylhexyl acrylate, 35 g dimethylaminopropyl methacrylamide (DMAPMA) and 1.1 g butyl mercaptopropionic acid. The pH of the reaction was adjusted from 5.0 to 10.8 with 80 g of 28 percent ammonium hydroxide and a solution of 0.014 g iron sulfate heptahydrate and 0.014 g of the tetrasodium salt of ethylenediamine tetraacetic acid in 10.7 g deionized water was then added to the reaction mixture. The second pre-emulsion, 1.9 g of tert-butyl hydroperoxide dissolved in 50 g of deionized water and 1.1 g of sodium formaldehydesulfoxylate dissolved in 50 g of deionized water were added continuously to the reaction mixture over 1.5 hours at 60° C., followed by an additional 3.0 g of tert-butyl hydroperoxide dissolved in 45 g deionized water and 2.0 g sodium formaldehydesulfoxylate dissolved in 52.5 g deionized water. The dispersion was then cooled to room temperature and 15 g of nonionic surfactant (Triton®, X-405, octylphenoxy polyethoxy ethanol, HLB: 17.9, 70% concentration) in 15 g of deionized water was added. The resulting two-stage amine after acid amphoteric polymer was produced from a first stage copolymer containing 25 percent 2-EHA, 20 percent Sty/5 MAA and from a second stage copolymer containing 25 2-EHA/20 Sty/5 DMAPMA, all in weight percentages based on polymers solids. The amphoteric polymer of Example 6 was found to have a 37.3 weight percent solids content, a pH of 10.6 and a Brookfield viscosity of 36 cps (measured with a spindle No. 1 turning at 60 rpm).

EXAMPLE 7

At the start of the preparation, 340 g of deionized water and 10.2 g of Alipal® CO-436 anionic surfactant, ammonium salt of sulfate polyethoxynonylphenol @ 58 percent concentration were added to a 2 liter, round bottom, 4 neck glass flask, equipped with an agitator, a condenser, a thermocouple to monitor the temperature and inlet ports for nitrogen gas, and for adding reagents. The headspace was swept with nitrogen and the contents of the flask were heated to 85° C. In a separate vessel, a monomer pre-emulsion was prepared from 110 g deionized water, 10.2 g of Alipal® CO-436 anionic surfactant, 163.2 g styrene, 139.8 g butyl acrylate, 139.8 g butyl methacrylate 35 g methacrylic acid and 1.1 g butyl mercaptopropionic acid. A heel charge of 20 g of the monomer pre-emulsion, 0.75 g of ammonium persulfate dissolved in 7.5 g of deionized water and 1.4 g sodium carbonate dissolved in 15 g of deionized water was added to the reaction flask. After 10 minutes, the remainder of the first monomer pre-emulsion and 0.35 g of ammonium persulfate dissolved in 45 g of deionized water were added continuously to the flask over 1.5 hours while the reaction temperature was maintained at 85° C. A total of 45 g of deionized water was used to rinse the feed lines to the flask. The reaction mixture was held for additional 30 minutes at 85° C. and then cooled before adding 0.01 g of iron sulfate heptahydrate, 1.6 g of tert-butyl hydroperoxide and 1.1 g sodium formaldehydesulfoxylate in a total of 156 g of deionized water. After cooling to room temperature, the pH of the reaction mixture was adjusted to 6.0 with 28 percent aqueous ammonium hydroxide. The resulting one-stage acid containing emulsion copolymer produced from a monomeric mixture containing 30 percent BA, 35 percent Sty, 30 percent BMA and 5 percent MAA, all in weight percentages based on polymers solids, was found to have a 42.0 weight percent solids content, a pH of 6.0.

EXAMPLE 8

Comparative Example 8 was a one-stage acid containing emulsion polymer with composition 30 BA/35 MMA/30 BMA/5 MAA, prepared by the method of Example 7, except that the monomer pre-emulsion was prepared from 110 g deionized water, 10.2 g of Alipal® CO-436 anionic surfactant, 163.2 g methyl methacrylate, 139.8 g butyl acrylate, 139.8 g butyl methacrylate 35 g methacrylic acid and 1.1 g butyl mercaptopropionic acid. The resulting anionic emulsion polymer was found to have a 42.2 weight percent solids content, a pH of 6.0.

EXAMPLE 9

Example 9 was a two-stage amine after acid amphoteric polymer with composition (15 BA/17.5 MMA/15 BMA/2.5 MAA-first stage copolymer)/(10 BA/17.5 MMA/12.5 BMA/10 DMAEMA-second stage copolymer), prepared by the method of Example 6, except that the monomers in the first pre-emulsion were 105 g butyl acrylate, 122.5 g methyl methacrylate, 105 g butyl methacrylate and 17.5 g methacrylic acid, the monomers in the second pre-emulsion were 70 g butyl acrylate, 122.5 g methyl methacrylate, 87.5 g butyl methacrylate and 70 g dimethylaminoethyl methacrylate, and the first pre-emulsion was added to the reactor over 3 hours and the second pre-emulsion was added to the reactor over 30 minutes. In addition, the nonionic surfactant was omitted. The resulting two-stage amine after acid amphoteric polymer produced from a first stage monomeric mixture containing 15 percent BA, 17.5 percent MMA, 15 percent BMA and 2.5 MAA and from a second stage monomeric mixture containing 10 BA, 17.5 percent MMA, 12.5 percent BMA and 10 percent DMAEMA, all in weight percentages based on polymers solids, was found to have a 42.8 weight percent solids content.

EXAMPLE 10

Example 10 was a two-stage amine after acid amphoteric polymer with composition (15 BA/17.5 Sty/15 BMA/2.5 MAA-first stage copolymer)/(10 BA/17.5 Sty/12.5 BMA/10 DMAEMA-second stage copolymer), prepared by the method of Example 6, except that the monomers in the first pre-emulsion were 105 g butyl acrylate, 122.5 g styrene, 105 g butyl methacrylate and 17.5 g methacrylic acid, the monomers in the second pre-emulsion were 70 g butyl acrylate, 122.5 g styrene, 87.5 g butyl methacrylate and 70 g dimethylaminoethyl methacrylate, and the first pre-emulsion was added to the reactor over 3 hours and the second pre-emulsion was added to the reactor over 30 minutes. In addition, the nonionic surfactant was omitted from this sample. The resulting two-stage amine after acid amphoteric copolymer produced from a first stage monomeric mixture containing 15 percent BA, 17.5 percent Sty, 15 percent BMA and 2.5 MAA and from a second stage monomeric mixture containing 10 BA, 17.5 percent Sty, 12.5 percent BMA and 10 percent DMAEMA, all in weight percentages based on polymers solids, was found to have a 41.8 wt % solids content.

Treatment of Leather

All retanned leathers were prepared from either lightweight (thickness varying from 1.0 to 1.4 mm) or heavyweight (thickness varying from 1.9 to 2.3 mm) shaved wet-blue, chrome tanned bovine leather. The retanning step was conducted in matched tanning drums manufactured by Dose Maschinenbau Gmbh, which were specifically designed for wet-end leather procedures. These heated, rotating, stainless steel drums had a volume of about 396 liters.

All the weights used during the retanning or any subsequent steps, such as, coloring and fatliquoring steps, were based on the relative weight of the wet blue stock (chrome tanned leather) in a tanning drum. For example, a 100 percent float was a weight equal to the weight of the wet blue stock. A 200 percent float would be equal to the addition of twice the amount of water to stock weight. The term "offer" means the amount weight of dry (also known as solid additives or copolymer solids), added to the float.

Evaluation of Treated Leather

The evaluation the retanned leather examples included physical measurements, aesthetic handle evaluations, and qualitative color evaluations. The retanned leather examples were grouped into sets of six to four examples to reflect experimental controls on retan process, raw materials, or blue stock. The treated leather examples prepared by the retan processes were subject to physical testing for Tongue Tear: The crust leather's strength was measured by a tensile strength tester similar to that used for conducting the Standard Test Method for Tearing Strength, Tongue Tear of Leather, ASTM D4704-93. The sole exception was that the leather sample did not have a 4.76 mm hole located on the long axis 25.4 mm from one end. The Tongue Tear test involved cutting the test specimen and then pulling the two tongues apart. The Tear Strength was reported in Newtons. The tongue tear strength for a piece of upholstery leather, such as, the light weight leather, used in the Examples 1 to 6, was measured against a scale in which a value of 20 Newtons is considered to be acceptable and and a value of 30 Newtons is considered to be excellent.

In addition to the quantitative evaluation of thickness ratio, temper, water resistance, and strength, we qualitatively observed and evaluated aesthetic properties of the treated leather by methods familiar to those skilled in the art. The rating of the grain break pattern seen when evaluating crust leather has both an objective and an end use component. Objectively, finer and tighter grain is better, but what is very good for a heavyweight, stand-up boot may not be acceptable for a fine piece of lightweight leather. The attributes of color as described in *Color Matching With Dyes On Leather*, Joseph A. Casnocha, a Sandoz, Ltd. publication, have three recognized components: hue, lightness, and saturation. Dyeing results are rated qualitatively, but are expected to relate to getting a vivid, true color with minimum dye used during the coloring step.

Grain Break is evaluated by visual inspection (observation) of the treated leather as it is hand flexed or bent. The break is rated on a scale of excellent, good, fair and poor. A grain break rating better than poor but less than fair (fair to poor) is considered acceptable for heavy leather stock.

Dyeing Result is evaluated by visual inspection of the treated leather with the emphasis on the hue (relative to the expected "true color") and the vividness (lack of grayness, whiteness, or bleaching). The color is rated on a scale of very good, good, fair, and poor.

Retan Procedure for Examples 1 to 6

1. Shaved wet blue, chrome-tanned, 1.0 to 1.4 mm (light weight stock) bovine stock was tumbled for 15 minutes with 200 percent float maintained at 40° C. After 15 minutes, the water was drained from the tanning drum, supplied by Dose Maschinenbau Gmbh.

2. Sodium formate at 0.5 weight percent based on the blue stock weight was added to 200 percent fresh float maintained at 40° C. The stock was neutralized for 75 minutes and the pH of the float was adjusted to 5.25 with sodium bicarbonate. After 75 minutes, the float was drained from the tanning drum.

3. The neutralized stock was then washed in the tanning drum for another 15 minutes with 200 weight percent fresh float at 40°C. for 15 minutes, and after 15 minutes the water was drained.

4. The stock was retanned for 60 minutes with 200 percent float at 40° C. with a 5 weight percent solids of syntan offers of Examples 1 through 6, described above. The stock was then dyed with 0.75 weight percent of Derma Havana R® dye (product as supplied by Sandoz Chemicals Corporation, Charlotte, N.C. 28205) for 30 minutes. The dye containing stock was then "fixed" or acidified with 10 percent of formic acid by adjusting pH to less than 4.0. After 120 minutes, the retan float was drained.

5. The fixed, retanned stock was washed in the tanning drum for 15 minutes with 200 percent float maintained at 40° C. After 15 minutes the water was drained.

6. The retanned stock was fatliquored for 60 minutes with 200 percent float at 40° C. containing 4 weight percent (product as sold by supplier) based on the blue stock weight of Morite® G82 [a blend of 67 percent natural and 33 percent synthetic fatliquors with 2.5 percent combined $SO_3$ (sulfonate content) from Whittemore-Wright Co.)] and then fixed with 10 percent formic acid to pH less than 3.5.

8. The fatliquored and retanned stock was hauled, horsed overnight, set out by hand, vacuum dried for 1 minute at 70° C., aired off overnight at room temperature, and then staked before evaluation.

The test results for leather retanned with Examples 7 through 10 are tabulated below in Table 1.

TABLE 1

| Example | Coloring Results | Tongue Tear (Newtons) |
| --- | --- | --- |
| 1 | 5th best brown hue, bleached to pastel-fair color | 22.8 |
| 2 | 4th best brown hue, slightly bleached tan-good color | 16.8 |
| 3 | 6th best brown hue, bleached whitish-poor color | 22.4 |
| 4 | 3rd best brown hue, less vivid-good color | 19.0 |
| 5 | 2nd best brown hue, vivid-very good color | 20.1 |
| 6 | The best brown hue, vivid-very good color | 22.4 |

Examples 1 through 6 exhibited excellent grain break and firm temper. Table 1, illustrates inventors unexpected discovery of utilizing a two-stage amphoteric polymers (Examples 5 and 6) which impart best color expression characteristic while still retaining other critical properties, such as, tensile strength (tongue tear) and grain break relative to the comparative Examples 1 through 4.

Retan Procedure for Examples 7 to 10

1. Shaved wet blue, chrome-tanned, 1.9 to 2.3 mm (heavy weight stock) thick bovine stock was tumbled in the tanning drum for 15 minutes with 200 percent float maintained at 40° C. After 15 minutes, the water was drained from the tanning drum, supplied by Dose Maschinenbau Gmbh.

2. The stock was neutralized for 120 minutes in 200 percent fresh float maintained at 40° C. with 1 percent sodium acetate and 0.5 percent solids of Leukotan® 1028 acrylic polymer was supplied by Rohm and Haas Company, Philadelphia, Pa. The pH of the float was adjusted to 5.5 with sodium bicarbonate. After 120 minutes, the float was drained.

3. The neutralized stock was washed in the tanning drum for 15 minutes with 200 percent fresh float maintained at 50° C. for 15 minutes. After 15 minutes the water was drained.

4. The stock was retanned for 120 minutes with 125 percent float maintained at 60° C. The float contained 4 percent solids of Lubritan® WP acrylic polymer supplied by Rohm and Haas Company, Philadelphia, Pa. as a primary acrylic polymeric lubricating syntan-and waterproofing agent and 4 percent solids of syntan offer of Examples 7 through 10 described earlier as an auxiliary retan agent, 0.5 percent Vitrolan® Orange dye, (supplied by Sandoz Chemicals Corporation, Charlotte, N.C. 28205). The stock was fixed with 10 percent formic acid to pH of less than 4.0. After 120 minutes the float was drained.

5. The fixed stock was washed in the tanning drum for 15 minutes with 200 percent float maintained at 35° C. After 15 minutes, the water was drained.

6. The stock was retanned for 60 minutes with 200 percent float maintained at 35° C. with 5 weight percent (product as sold by supplier) based on the blue stock weight of Wayne Tan® 150 chromium sulfate supplied at 33 percent basicity. Wayne Tan® 150 chromium sulfate is supplied by Wayne Chemical Corporation, Milwaukee, Wis. After 60 minutes, the chrome float was drained.

7. The stock was washed twice for 15 minutes with 200 percent float maintained at 35° C. After each 15 minute wash cycle the water was drained.

8. The retanned stock was hauled, horsed overnight, set out by hand, vacuum dried for 2 minutes at 70° C., aired off overnight at room temperature, and staked before evaluation.

The test results for leather retanned with Examples 1 through 6 are tabulated below in Table 2:

TABLE 2

| Example | Coloring Results | Grain Break Rating |
|---|---|---|
| 7 | 3rd best orange hue, off shade-fair color | Good-the best grain break |
| 8 | 4th best orange hue, pastel brown-poor color | Fair to good-3rd best grain break |
| 9 | 2nd best orange hue, vivid-good color | Fair to poor-4th best grain break, |
| 10 | The best orange hue, vivid-good color | Fair to good-2nd best grain break |

Table 2, illustrates inventors unexpected discovery of utilizing a two-stage amphoteric polymers (Examples 9 and 10) which impart best color expression characteristic while still retaining acceptable grain break relative to the comparative Examples 7 and 8.

We claim:

1. A method of treating a tanned leather stock comprising:
retanning said tanned leather stock with particles of an amphoteric polymer dispersed in an aqueous medium to produce a retanned leather stock having improved color expression characteristic, said amphoteric polymer particles being prepared by:
emulsion polymerizing in said aqueous medium at least one monomer containing an acid group in the range of from 0.5 percent to 20 percent with at least one first stage comonomer in the range of from 99.5 percent to 80 percent to form a first stage copolymer having a Tg varying from −40° C. to +60° C. and a GPC weight average molecular weight varying in the range of from 10,000 to 1,000,000, all percentages being in weight percent based on the total weight of amphoteric polymer solids;
raising the pH of said aqueous medium sufficiently to avoid coagulation of said amphoteric polymer particles in the presence of an amine group by adding a base to said aqueous medium;
emulsion polymerizing in said aqueous medium at least one monomer containing said amine group in the range of from 0.5 percent to 20 percent with at least one second stage comonomer in the range of from 99.5 percent to 80 percent to form a second stage copolymer having a Tg varying from −40° C. to +60° C. and a GPC weight average molecular weight varying in the range of from 10,000 to 1,000,000, all percentages being in weight percent based on the total weight of amphoteric polymer solids.

2. The method of claim 1 wherein said amphoteric polymer comprises in the range of from 90 percent to 10 percent of said first stage copolymer and in the range of from 10 percent to 90 percent of said second stage copolymer, all percentages being in weight percent based on the total weight of amphoteric polymer solids.

3. The method of claim 1 wherein said monomer containing and acid group is selected from the group consisting of acrylic acid, methacrylic acid, itaconic acid, maleic acid, fumaric acid, vinyl benzoic acid, half-esters of ethylenically unsaturated dicarboxylic acids, half-amides of ethylenically unsaturated dicarboxylic acids and mixtures thereof.

4. The method of claim 1 wherein said monomer containing the amine group is selected from the group consisting of amino-substituted olefins, basic nitrogen-containing heterocycles that carry a polymerizable ethylenically unsaturated substituent, esters of amino alcohols with ethylenically unsaturated carboxylic acids, monoamides of diamines with ethylenically unsaturated carboxylic acids, and mixtures thereof.

5. The method of claim 1 wherein said base is selected from the group consisting of ammonia, alkali metal hydroxide, morpholine and lower alkyl amine.

6. The method of claim 1 wherein said aqueous medium containing said particles of said amphoteric polymer is added to a float containing a colorant.

7. The method of claim 1 wherein said aqueous medium containing said particles of said amphoteric polymer is added to a float containing a fatliquor, a replacement syntan or an acrylic syntan.

8. A retanned leather stock having improved color expression characteristic produced by the method of claim 1.

* * * * *

UNITED STATES PATENT AND TRADEMARK OFFICE
CERTIFICATE OF CORRECTION

PATENT NO. : 5,709,714
DATED : Jan. 20, 1998
INVENTOR(S) : John Natoli and Anthony Frank Volpe, Jr.

It is certified that error appears in the above-identified patent and that said Letters Patent is hereby corrected as shown below:

```
Column 14, line 32
delete "7" and substitute therefor -- 1 --

Column 14, line 33
delete "10" and substitute therefor -- 6 --

Column 15, line 38
delete "1" and substitute therefor -- 7 --

Column 15, line 39
delete "6" and substitute therefor -- 10 --
```

Signed and Sealed this

Twenty-eighth Day of April, 1998

Attest:

BRUCE LEHMAN

Attesting Officer

Commissioner of Patents and Trademarks